United States Patent [19]
Yang et al.

[11] Patent Number: 6,093,790
[45] Date of Patent: Jul. 25, 2000

[54] ORGANIC-SOLUBLE AROMATIC POLYIMIDES, ORGANIC SOLUTIONS AND PREPARATION THEREOF

[75] Inventors: Chin-Ping Yang; Huei-Wen Yang, both of Taipei, Taiwan

[73] Assignee: National Science Council, Taipei, Taiwan

[21] Appl. No.: 09/135,608

[22] Filed: Aug. 18, 1998

[51] Int. Cl.$^7$ .............................. C08G 73/10; C08G 69/26

[52] U.S. Cl. .......................... 528/353; 528/125; 528/128; 528/171; 528/172; 528/173; 528/174; 528/179; 528/183; 528/185; 528/220; 528/229; 528/350; 525/432; 524/600; 524/606; 524/607

[58] Field of Search ..................................... 528/353, 171, 528/125, 128, 172, 173, 174, 179, 183, 185, 188, 220, 229, 350; 524/600, 606, 607; 525/432

[56] References Cited

U.S. PATENT DOCUMENTS

| | | | |
|---|---|---|---|
| 5,268,487 | 12/1993 | Yang et al. | 548/456 |
| 5,414,070 | 5/1995 | Yang et al. | 528/310 |
| 5,817,741 | 10/1998 | Liaw et al. | 528/341 |
| 5,844,065 | 12/1998 | Liaw et al. | 528/353 |

OTHER PUBLICATIONS

Liaw et al., "Synthesis and Properties of Polyimides Derived from 1,4–Bis(4–aminophenoxy)2–tert–butylbenzene" Polymer Journal, vol. 28, No. 11, pp. 970–975 (1996).

*Primary Examiner*—P. Hampton-Hightower
*Attorney, Agent, or Firm*—Fish & Richardson P.C.

[57] ABSTRACT

The present invention provides polyimides and co-polyimides that are organosoluble. The polyimides and co-polyimides are prepared from an aromatic diamine having tert-butyl group, i.e., 1,4-bis(4-aminophenoxy)-2-tert-butyl-benzene, or its mixture with other diamines, and a mixture of dianhydrides that containing DSDA or 6FDA or other diether-dianhydrides.

34 Claims, No Drawings

6,093,790

ORGANIC-SOLUBLE AROMATIC POLYIMIDES, ORGANIC SOLUTIONS AND PREPARATION THEREOF

FIELD OF THE INVENTION

The present invention relates generally to a formulation and preparation method of a kind of tractable polyimides that are organic-soluble with controllable solubility.

BACKGROUND OF THE INVENTION

Aromatic polyimides were well known as polymeric materials of high performance for their excellent thermal stabilities and balanced mechanical and electric properties. Polyimides were mainly used in the aerospace and electronic industries in the forms of films and moldings. Other uses for these polymers such as adhesives, gas separation membranes, composite matrices, coatings, and foams were rapidly increasing. However, aromatic polyimides are difficult to be processed because of high softening temperatures and limited solubilities in commercially available solvents; accordingly the improvements to their solubility and heat plasticity without decreasing their original excellent characteristics are the aims of the present researchers.

The literature is flooded with claims of polyimides according to ourspecific paper and patent search for soluble polyimides. Most of the literature described the improvement of diamines and relatively less literature described the invention of dianhydrides in the preparation of organo-soluble polyimides. The diamines used in the synthesis of organosoluble polyimides have in general three kinds of structures. The first type is polyimides prepared from a polysiloxane diamine, which have an improved adhesion with a semiconductor substrate but suffer poorer thermal properties and strength of films. The second type is polyimides prepared from a diamine having two meta amino groups [such as, 3,3'-diaminodiphenylsulfone and 1,3-bis(3-aminophenoxy)benzene], which have enhanced solubility but a lower degree of polymerization due to poor reactivity of the diamine. The third type is polyimides prepared from a diamine having two para amino groups, which will have organosolubility only when the diamines have more than one flexible large molecule groups selected from isopropyl, hexafluoroisopropyl, ether and sulfone.

Our specific paper and patent search for organosoluble polyimides based on diamine are listed as follows:

(a) Patents

| | |
|---|---|
| JP 09,118,808(1997) | Chemical Abstract 127: 52287j |
| EP 729,996(1996) | Chemical Abstract 125: 276948x |
| U.S. Pat. No. 5,480,965(1996) | Chemical Abstract 124: 345157g |
| JP 07,224,152(1995) | Chemical Abstract 124: 31222g |
| JP 07,310,048(1995) | Chemical Abstract 124: 291209e |
| EP 639,621(1995) | Chemical Abstract 123: 85015q |
| JP 07,224,151(1995) | Chemical Abstract 123: 315836q |
| JP 07,224,150(1995) | Chemical Abstract 123: 315835p |
| JP 06,172,524(1994) | Chemical Abstract 121: 281875t |
| JP 06,172,523(1994) | Chemical Abstract 121: 281874s |
| JP 06,172,525(1994) | Chemical Abstract 121: 281876u |
| U.S. Pat. No. 5,212,279(1993) | Chemical Abstract 119: 251699e |
| JP 04,337,326(1992) | Chemical Abstract 119: 73356f |
| JP 04,108,879(1992) | Chemical Abstract 117: 92386r |
| JP 04,108,880(1992) | Chemical Abstract 117: 92387s |
| EP 438,751(1991) | Chemical Abstract 115: 234851y |
| U.S. Pat. No. 4,931,539(1990) | Chemical Abstract 113: 133121p |
| JP 02 43,221(1990) | Chemical Abstract 113: 41153c |

-continued

| | |
|---|---|
| JP 02 92,930(1990) | Chemical Abstract 113: 116471k |
| JP 02,286,706(1990) | Chemical Abstract 115: 115256y |
| EP 284,803(1988) | Chemical Abstract 110: 155428j |
| JP 63 00,353(1988) | Chemical Abstract 109: 46242c |
| JP 62,265,326(1987) | Chemical Abstract 108: 133522s |
| JP 61,108,627(1986) | Chemical Abstract 106: 20093t |
| JP 61,241,358(1986) | Chemical Abstract 106: 157082h |
| JP 61 57,620(1986) | Chemical Abstract 105: 153750f |
| JP 61 59,334(1986) | Chemical Abstract 105: 200510q |
| EP 194,865(1986) | Chemical Abstract 105: 228674v |
| JP 60,217,261(1985) | Chemical Abstract 104: 188323a |
| Japan. 74 12,592(1974) | Chemical Abstract 83: 62006d |
| Japan. 74 19,119(1974) | Chemical Abstract 82: 126002p |
| Japan. 74 18,639(1974) | Chemical Abstract 82: 125993a |
| Japan. 74 30,717(1974) | Chemical Abstract 82: 112854f |
| Japan. 74 18,118(1974) | Chemical Abstract 82: 58904g |
| Japan. 71 17,145(1971) | Chemical Abstract 75: 118915d |
| Fr. 1,539,074(1968) | Chemical Abstract 71: 4608t |

(b) Articles

1. Arnold, C. A.; etc.; Polymer 30, 986(1989).
2. Omote, T.; etc.; Polym. Eng. Sci. 29, 945(1989).
3. Lee, H.-R; etc.; Macromolecules. 23, 502(1990).
4. Arnold, F. E,; etc.; J. Mater. Chem. 3, 353(1993).

Our specific paper and patent search for organosoluble polyimides based on diether-diamine:

1. Yang C.-P; Lin J.-H, J. Polym. Sci., Part A:, 31, 2153 (1993).
2. Yang C.-P; Chen W.-T, J. Polym. Sci., Part A:, 31, 2799(1993).
3. Yang C.-P; Chen W.-T, Macromol. Chem., 194, 3061 (1993).
4. Yang C.-P; Chen W.-T, Macromolecules, 26, 4865(1993).
5. Yang C.-P; Lin J.-H, J. Polym. Sci., Part A:, 32, 423 (1994).
6. Yang C.-P; Lin J.-H, J. Polym. Sci., Part A:, 32, 369 (1994).
7. Hsiao S.-H; Yang C.-P; Fan J.-C, J. Polym. Res., 1, No. 4, 345(1994).
8. Hsiao S.-H; Yang C.-P; Lin C.-K, J. Polym. Res., 2, No. 1, 1(1995).
9. Yang C.-P; Hsiao S.-H; Jang C.-C, J. Polym. Sci., Part A:, 33, 1487(1995).
10. Yang C.-P; Lin J.-H, Polymer, 36, 2607(1995).
11. Yang C.-P; Lin J.-H, Polymeric Materials Encyclopedia, 9, 6214(1996).
12. Hsiao S.-H; Yang C.-P; Yang C.-Y, J. Polym. Sci., Part A:, 35, 1469(1997).
13. Liaw D.-J; Liaw B.-Y, Polym. J.,28, 970(1996).

The diamine, 1,4-bis(4-aminophenoxy)-2-tert-butylbenzene, was first disclosed in U.S. Pat. No. 5,085,676 (1992). The assignee of this U.S. patent, Du Pont Company, has claimed that the polyamides synthesized fromf this diamine, 1,4-bis(4-aminophenoxy)-2-tert-butylbenzene, possess a potential application as a gas separation membrane.

SUMMARY OF THE INVENTION

The present invention provides a formulation and preparation method of a kind of tractable polyimides and co-polyimides that are organic-soluble with controllable solubility and also exhibit comparable thermal properties, and mechanical properties. The series of organosoluble polyimides (PIs) and co-polyimides of the present invention are prepared from an aromatic diamine having a tert-butyl group or a mixture of the aromatic diamine having tert-butyl group and other diamines with various dianhydrides. The specific diamine, 1,4-bis(4-aminophenoxy)-2-tert-butylbenzene, is not a new compound (U.S. Pat. No. 5,085,676); however, it is not known that polyimides and co-polyimides prepared from this diamine have excellent organosolubility.

The present invention also provides an organic solution of a polyimide and an organic solution of a co-polyimide, wherein the polyimide and co-polyimide are prepared from the specific diamine, 1,4-bis(4-aminophenoxy)-2-tert-butylbenzene, and the organic solvent is selected from the group consisting essentially of N-methyl-2-pyrrolidone (NMP), N,N-dimethylacetamide(DMAc), N,N-dimethylformamide(DMF), dimethyl sulfoxide(DMSO), m-cresol, pyridine, chloromethane, and chloroethane.

The present invention further discloses methods for forming a polyimide film and a co-polyimide film, which comprise the following common steps: mixing the polyimide or the co-polyimide of the present invention and the organic solvent described above to form an organic solution; casting or coating said organic solution on a substrate to form a layer; and removing said solvent from said layer to form a polyimide or co-polyimide film.

DETAILED DESCRIPTION OF THE INVENTION

In general the polyimide films are preapred by heating a precursor of the polyimide, poly(amic acid) (PAA), because most of the conventional polyimides (PIs) can not easily dissolve in an organic solvent. Therefore, it is not feasible to form a polyimide film on a substrate which is adversely affected by high temperature. Further, the polyimide is difficult to be processed because of high softening temperature thereof, limited solubility in commercially available solvents thereof, and poor moist and thermal stability of poly(amic acid). In the present invention, a specific diamine having the following formula II, 1,4-bis(4-aminophenoxy)-2-tert-butylbenzene, is prepared and used in the preparation of organosoluble polyimides, which also have excellent mechanical and thermal properties. In this invention we also provide a preparation method for a series of organosoluble co-polyimides, which can be prepared from the specific diamine (II) together with a conventional diamine and one or more than one dianhydrides. The solubility of co-polyimides is varied with the ratio of the specific diamine (II) and the conventional diamine used.

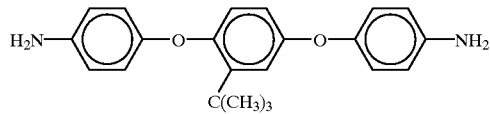

II

Certain dianhydrides ($Ar_3$) known in the art are suitable for use in the present invention to synthesize the organosoluble polyamides and co-polyimides. These dianhydrides ($Ar_3$) include (but not limited to) some commercially available dianhydrides, such as diphenylsulfone tetracarboxylic dianhydride (DSDA) and 4,4'-perfluoroisopropylidenediphthalic anhydride (6FDA); and some bis(ether anhydride) containing bisphenol groups, such as 1,4-bis(3,4-dicarboxyphenoxy)-2-tertbutylbenzene dianhydride (t-BBDA), 1,2-bis(3,4-dicarboxyphenoxy) benzene dianhydride, 2,3-bis(3,4-dicarboxyphenoxy) naphthalene dianhydride, 2,2'-bis(3,4-dicarboxyphenoxy) biphenyl dianhydride, 2,2-bis[4-(3,4-dicarboxyphenoxy) phenyl]hexafluoropropane dianhydride (6FDEDA), 1,1-bis [4-(3,4-dicarboxyphenoxy)phenyl]cyclohexane dianhydride. The polyimides prepared from the specific diamine (II) and the dianhydrides as described above show excellent organosolubility. It is apparent that the dianhydrides ($Ar_4$) which are suitable for synthesis of the organosoluble polyimide of the present invention can be mixed with the dianhydrides described above in various proportions to adjust the organosolubility in the synthesis of the co-polyimides of the present invention. The physical properties of the co-polyimides of the present invention (such as, mechanical properties, thermal stabilities, adhesion properties) will also be adjusted by changing the ratio of the two different dianhydrides ($Ar_3$ and $Ar_4$).

The organosoluble polyimides and co-polyimides prepared according to the present invention can be represented by the following formula I:

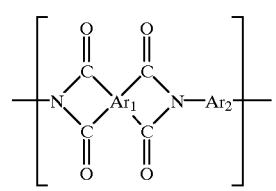

I

When only one dianhydride and one diamine are used, $Ar_1$ of the formula I is represented by the following $Ar_3$, and $Ar_2$ is represented by the following $Ar_5$:

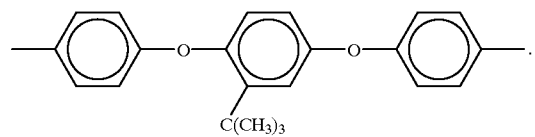

When two different dianhydrides and one diamine are used, the formula I can be rewritten as follows:

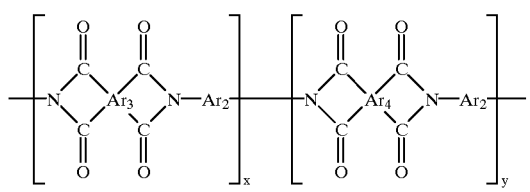

wherein Ar$_2$ is the Ar$_5$ defined above and

Ar$_3$:

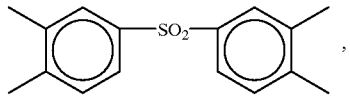

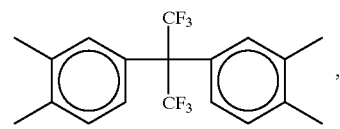

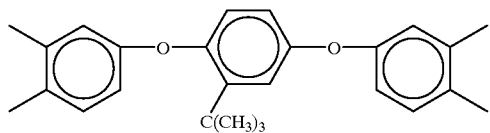

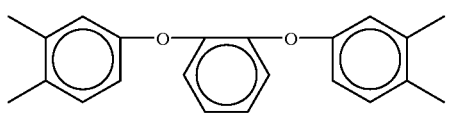

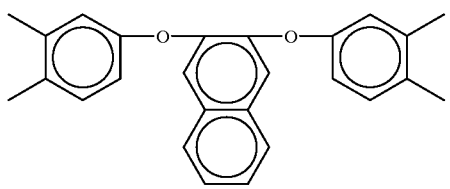

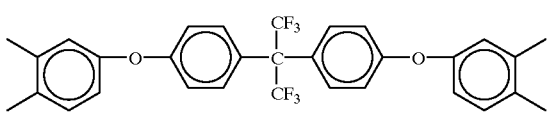

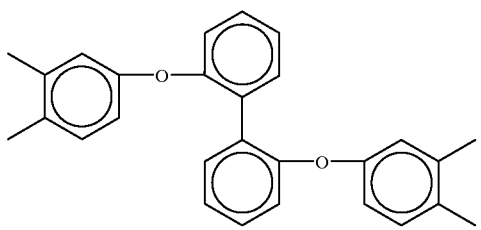

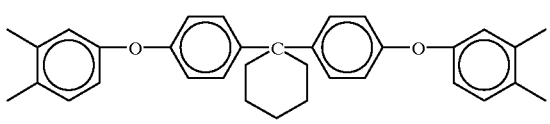

Ar$_4$:

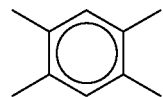

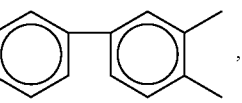

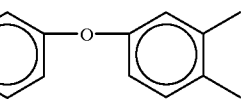

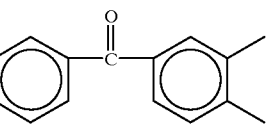

The units containing Ar$_3$ and Ar$_4$ are randomly arranged in the formula I. Preferably, the x and y are so arranged that (the units containing Ar$_3$):(the units containing Ar$_4$)= 99:1~5:95 (by weight).

Similarly, Ar$_2$ of the formula I can be contributed by two different diamines. In this case the formula I can be rewritten as follows:

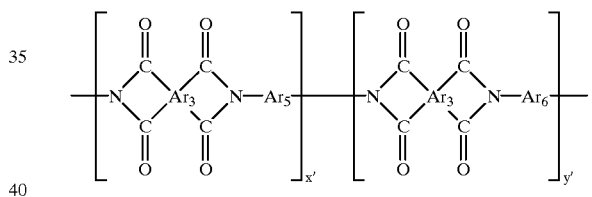

wherein Ar$_3$ and Ar$_5$ are defined as above, and Ar$_6$ is

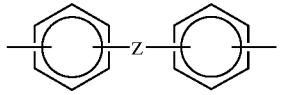

Z=O, S, CH$_2$, CO, SO$_2$, C(Me)$_2$, C(CF$_3$)$_2$, CR$^1$R$^2$, X—C$_6$H$_4$—X, X—C$_{10}$H$_8$—X, X—C$_6$R$^1$, R$^2$,R$^3$, R$^4$—X, or X—C$_6$H$_4$—Y—C$_6$H$_4$—X;

wherein X=O, S, CR$^1$R$^2$; and

Y=O, S, CH$_2$, CO, SO$_2$, C(Me)$_2$, C(CF$_3$)$_2$, CR$^1$R$^2$, aliphatic chain, or C$_6$H$_{10}$;

wherein R$^1$, R$^2$, R$^3$, R$^4$=H, halogen, Me, CF$_3$, or C(Me)$_3$, wherein Me=methyl group.

The units containing $Ar_5$ and $Ar_6$ are randomly arranged in the formula I. Preferably, the x' and y' are so arranged that (the units containing $Ar_5$):(the units containing $Ar_6$)= 99:1~5:95 (by weight).

It is apparent that the organosoluble co-polyimide (I) can be prepared from two different diamines and two different dianhydries according to the present invention, and the formula I can be rewritten as follows:

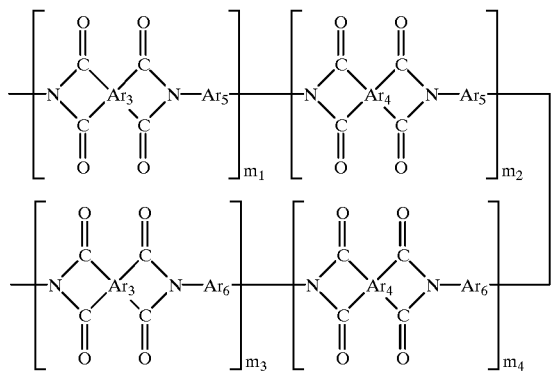

wherein $Ar_3$, $Ar_4$, $Ar_5$ and $Ar_6$ are defined as above; and the four different units are randomly arranged in the formula I. Preferably, $m_1$, $m_2$, $m_3$ and $m_4$ are so arranged that the units containing $Ar_5$ is greater than 5 wt % and the units containing $Ar_3$ is greater than 5 wt % based on the weight of the co-polyimide.

The $Ar_6$ may be unit of a polysiloxane diamine. A co-polyimide prepared from the polysiloxane diamine has an increased adhesion between a semiconductor and the co-polyimide.

Polyimides and co-polyimides of the present invention can be synthesized from various dianhydrides with various diamines by the conventional two-stage process that includes ring-opening polyaddition to the poly(amic acid)s in an appropriate solvent (such as DMAc) followed by chemical (additions of acetic anhydride and pyridine) or thermal cyclodehydration to the co-PIs and PIs. Polyimides and co-polyimides can also be prepared from the conventional one-stage process by heating the two reactants directly in a solvent having a high boiling point (such as m-cresol). The reactions for preparing PIs and co-Pis are showed in the following equations.

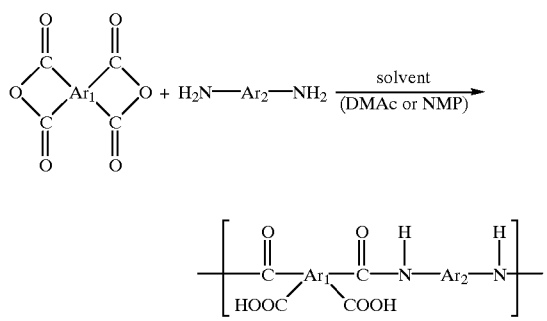

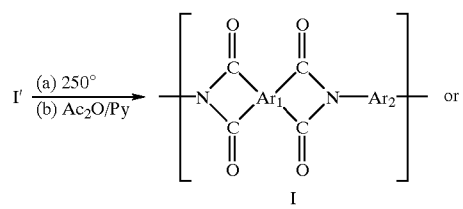

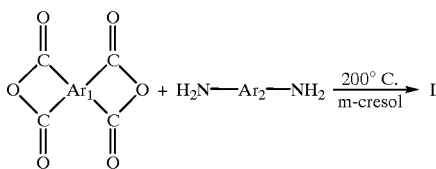

wherein $Ar_1$ and $Ar_2$ are defined as above.

EXAMPLE 1

Synthesis of 1,4-bis(4-aminophenoxy)-2-tert-butylbenzene

Tert-butylhydroquinone (t-BHQ) (8.31 g) and p-fluoronitrobenzon (15.9 g) were reacted in the presence of potassium carbonate (16 g) and DMF (80 mL) at 150–160° C. for 6 hr. The resulting mixture was cooled and added 80 mL methanol to form a precipitate. The precipitate was collected by filtration, washed with hot water and dried. Yield: 17.2 g (84%). mp 152–153° C. 16.32 g of the obtained dinitro compound [1, 4-bis(4-nitrophenoxy)-2-tert-butylbenzene], 0.12 g of 10% Pd—C, and 120 mL ethanol were introduced into a three-necked flask to which 12 mL of hydrazine monohydrate was added dropwise over a period of 1 hr at 80° C. After the addition was complete, the mixture was heated until nitrogen was disappeared. The mixture was then filtered to remove Pd/C and concentrated under reduced pressure. After cooling, white needle crystals were collected by filtration and recrystallized from ethanol. Yield: 12.5 g (90%). mp 129–130° C.

Elemental Anal. $C_{22}H_{24}O_2N_2$(348.44). Calcd.: C, 75.83%; H, 6.94%; N, 8.04%. Found: C, 75.66%; H, 7.31%; N, 7.56%.

EXAMPLE 2

Diamine (1.0 mmol) [such as, (a) 4,4'-oxydianiline(4,4'-ODA) 0.20 g (b) 1,4-bis(4-aminophenoxy)benzene 0.292 g (c) 1,4-bis(4-aminophenoxy)-2-methylbenzene 0.306 g (d) 1,4-(4-aminophenoxy)-2-tert-butylbenzene 0.348 g] was dissolved in 5 mL of dried DMAc in a 25-mL flask. After the diamine was dissolved completely, 0.358 g of DSDA was added. The mixture was stirred at room temperature for 1 hr and a high viscosity poly(amic acid) (PAA) was obtained. The PAA solution was poured onto a φ=9 cm glass culture dish, which was placed in a 80° C. oven 1 hr to remove the solvent. The semidried PAA film was heated by sequential heating at 120° C., 150° C., 180° C., 210° C., and 250° C. for 15 min each. By soaking in water, a PI film was self-stripped off from the glass surface. The resulting polymers have the following formulas and characters of inherent viscosity and solubility.

| Code | Formula | $\eta_{inh}$ (dL/g) |
|---|---|---|
| (a) PI-I-(1) | [structure with SO₂ bridge and diphenyl ether] | 1.50 |
| (b) PI-I-(2) | [structure with SO₂ bridge and triphenyl diether] | 0.85 |
| (c) PI-I-(3) | [structure with SO₂ bridge and triphenyl diether with CH₃] | 1.10 |
| (d) PI-I-(3) | [structure with SO₂ bridge and triphenyl diether with C(CH₃)₃] | 1.35 |

Solubility[a]:

| Polymer | Solvent[b] | | | | | | | |
|---|---|---|---|---|---|---|---|---|
| | NMP | DMAc | DMF | DMSO | m-cresol | Py | $CH_2Cl_2$ | conc. $H_2SO_4$ |
| PI-I-(1) | −[a] | −[a] | −[a] | −[a] | −[a] | −[a] | −[a] | +[a] |
| PI-I-(2) | −[a] | −[a] | −[a] | −[a] | −[a] | −[a] | −[a] | +[a] |
| PI-I-(3) | −[a] | −[a] | −[a] | −[a] | −[a] | −[a] | −[a] | +[a] |
| PI-I-(4) | +[a] | +[a] | +[a] | +[a] | +[a] | +[a] | +[a] | +[a] |

[a]Measured at a concentration of 0.5 wt %; +: soluble at room temperature; −: insoluble.
[b]NMP: N-methyl-2-pyrrolidone; DMAc: N,N-dimethylacetamide; DMF: N,N-dimethylformamide; DMSO: dimethyl sulfoxide; Py: pyridine; THF: tetrahydrofuran.

As shown in this example, only the specific diamine (II) is able to prepare an organosoluble polyimide.

EXAMPLE 3

(a) Diamine II (0.348 g, 1.0 mmol) was dissolved in 5.0 mL of dried DMAc in a 25-mL flask. After the diamine was dissolved completely, 0.208 g (1.0 mmol) PMDA was added. The mixture was stirred at room temperature for 1 hr and added with 1.0 mL of a mixture of acetic anhydride and pyridine (volume ratio 2:1) to the PAA solution. The mixture was stirred at 80–100° C. for 1 hr. The polymer solution was poured into methanol to yield white precipitate which was collected by filtration, washed thoroughly with methanol, and dried at 100° C. (b) Dianhydride BPDA was used to prepare PI according to the same procedures as described in the above (a). (c) Dianhydride ODPA was used to prepare PI according to the same procedures as described in the above (a). (d) Dianhydride BTDA was used to prepare PI according to the same procedures as described in the above (a). (e) Dianhydride 6FDA was used to prepare PI according to the same procedures as described in the above (a). The resulting polymers have following inherent viscosity and solubility:

(1) Inherent viscosity:

| Code | Composition | $\eta_{inh}$ (dL/g) | |
|---|---|---|---|
| (a) PI-I-(5) | II/PMDA | 1.03 | ($H_2SO_4$) |
| (b) PI-I-(6) | II/BPDA | 1.97 | ($H_2SO_4$) |
| (c) PI-I-(7) | II/ODPA | 2.03 | ($H_2SO_4$) |
| (d) PI-I-(8) | II/BTDA | 1.27 | ($H_2SO_4$) |
| (e) PI-I-(9) | II/6FDA | 0.78 | (DMAc) |

(2) solubility:

| | Solvent | | | | | | | | |
|---|---|---|---|---|---|---|---|---|---|
| Code | NMP | DMAc | DMF | DMSO | m-cresol | Py | THF | $CH_2Cl_2$ | conc. $H_2SO_4$ |
| (a) PI-I-(5) | − | − | − | − | − | − | − | − | + |
| (b) PI-I-(6) | − | − | − | − | +− | − | − | − | + |
| (c) PI-I-(7) | +− | − | − | − | +− | + | − | + | + |
| (d) PI-I-(8) | +− | − | − | − | +− | +− | − | − | + |
| (e) PI-I-(9) | + | + | + | + | + | + | + | + | + |

[a] +: soluble; −: insoluble.
[b] NMP: N-methyl-2-pyrrolidone; DMAc: N,N-dimethylacetamide; DMF: N,N-dimethylformamide; DMSO: dimethyl sulfoxide; Py: pyridine; THF: tetrahydrofuran.

In the Examples 2 and 3, PIs were synthesized from the diamine II with six different commercially available dianhydrides by the chemical conventional process. Among them only the two PIs prepared from the dianhydrides of 6FDA and DSDA (example 2) show organosoluble.

EXAMPLE 4

The bis(ether anhydride)s derived from some special bisphenols were used to prepare organosoluble PIs (a, b, c, d and e) according to the procedures described in Example 3, for examples, (a) 1,2-bis(3,4-dicarboxyphenoxy)benzene dianhydride (b) 2,3-bis(3,4-dicarboxyphenoxy)naphthalene dianhydride (c) 2,2'-bis(3,4-dicarboxyphenoxy)-biphenyl dianhydride (d) 2,2-bis[4-(3,4-dicarboxyphenoxy)phenyl] hexafluoropropane dianhydride (e) 1,4-bis(3,4-dicarboxy)-2-tert-butylbenzene dianhydride.

The inherent viscosity and solubility of the resulting polymers are shown as follows:

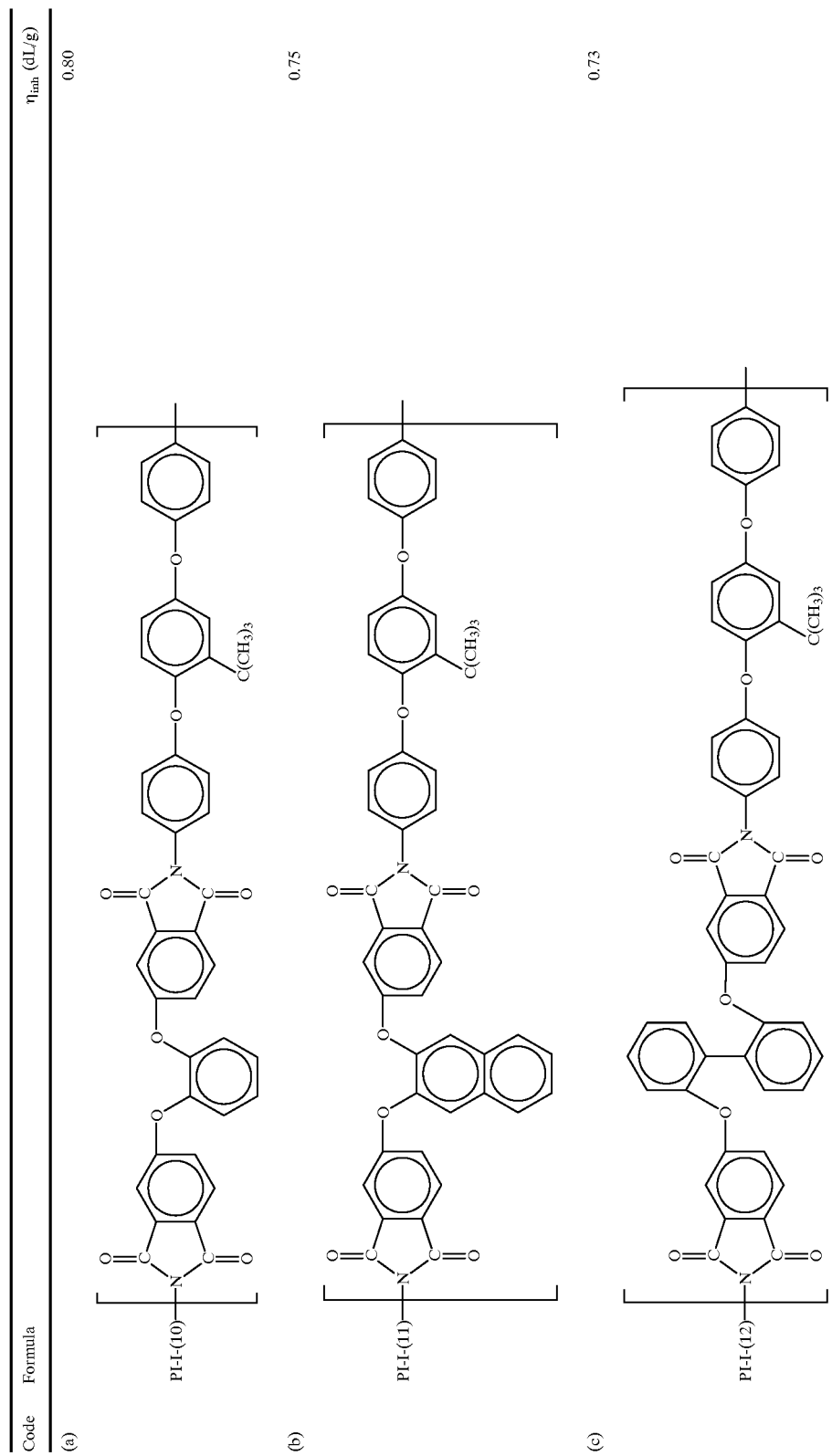

-continued
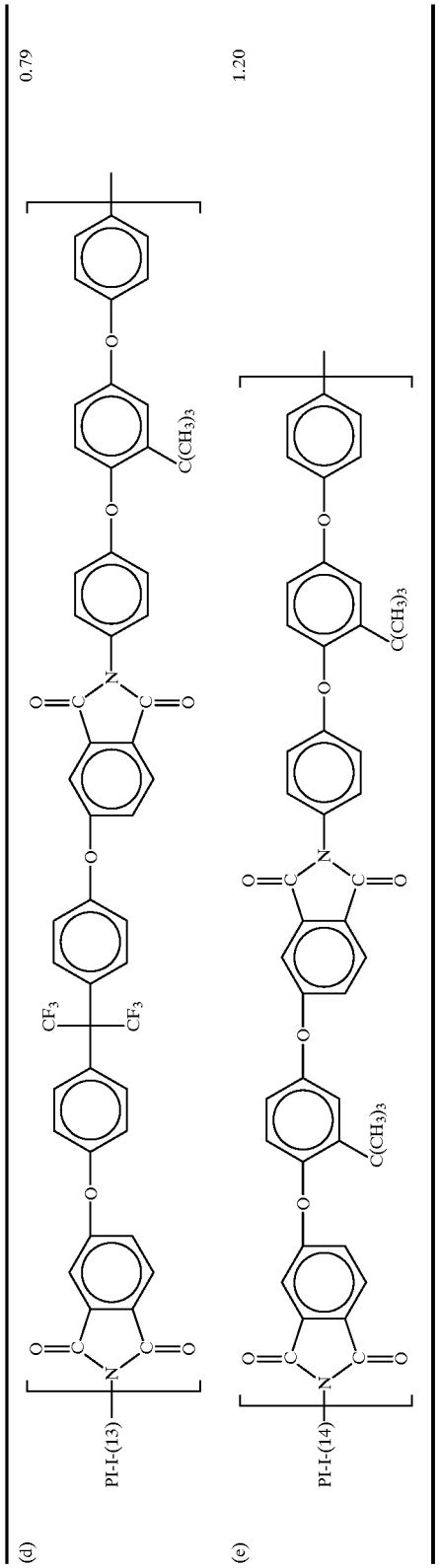
Solubility[a]:
| Code | Solvent | | | | | | |
|---|---|---|---|---|---|---|---|
| | NMP | DMAc | DMF | DMSO | m-cresol | Py | THF | CH$_2$Cl$_2$ |
| PI-I-(10) | + | + | ± | ± | + | + | + | + |
| PI-I-(11) | + | + | + | + | + | + | + | + |
| PI-I-(12) | + | + | + | + | + | + | + | + |
| PI-I-(13) | + | + | + | + | + | + | + | + |
| PI-I-(14) | + | + | + | + | + | + | + | + |
[a]Measured at a concentration of 0.5 wt %; +: soluble at room temperature; −: insoluble; ±: partial soluble.

This example shows that the diamine II and five different bis(ether dianhydride)s can be used to synthesize organo-soluble PIs.

EXAMPLE 5

(a) The diamine (II) (0.696 g, 2.0 mmol) was dissolved in 14 mL of dried DMAc in a 50-mL flask. After the diamine was dissolved completely, 0.294 g (1.0 mmol) BDPA and 0.444 g (1.0 mmol) 6FDA were added. The mixture was stirred at room temperature for 1 hr. The inherent viscosity of the resulting poly(amic acid) (PAA) in DMAc was 1.57 dL/g, measured at a concentration of 0.5 g/dL at 30° C. 2.5 mL of a mixture of acetic anhydride and pyridine (volume ratio 2:1) was added to the PAA solution. The mixture was stirred at 80–100° C. for 1 hr. The polymer solution was poured into methanol. The white precipitate was collected by filtration, washed thoroughly with methanol, and dried at 100° C.

(b) 2 mmol of the diamine (II) and 2 mmol of BPDA were dissolved in dried DMAc to prepare a high viscosity solution of poly(ether amic acid) (PAA) according to the same procedures as described in (a). A mixture of acetic anhydride and pyridine with a suitable concentration (for example, 1 mL of acetic anhydride and 0.5 mL of pyridine) was added to the PAA solution. The mixture was stirred at 80° C. for 1 hr. The polyimide solution was poured into methanol. The white resulting polyimide precipitate was collected by filtration, washed thoroughly with methanol, and dried at a suitable temperature. The resulting polyimide PI-I-(6) has an inherent viscosity ($\eta_{inh}$) of 1.97 dL/g in conc. $H_2SO_4$ solution (30° C.).

(c) 2 mmol of 1,4-bis(4-aminophenoxy)benzene and a mixture of BPDA (1 mmol) and 6FDA (1 mmol) were dissolved in dried DMAc to prepare a polyimide according to the same procedures as described in (a). The white polyimide would precipitate in the PAA solution in the chemical cyclodehydration procedure. The resulting polyimide PI-II-(2) has an inherent viscosity ($\eta_{inh}$) of 1.27 dL/g in conc. $H_2SO_4$ solution. The three different polyimides prepared in this example have the following formulas and solubility.

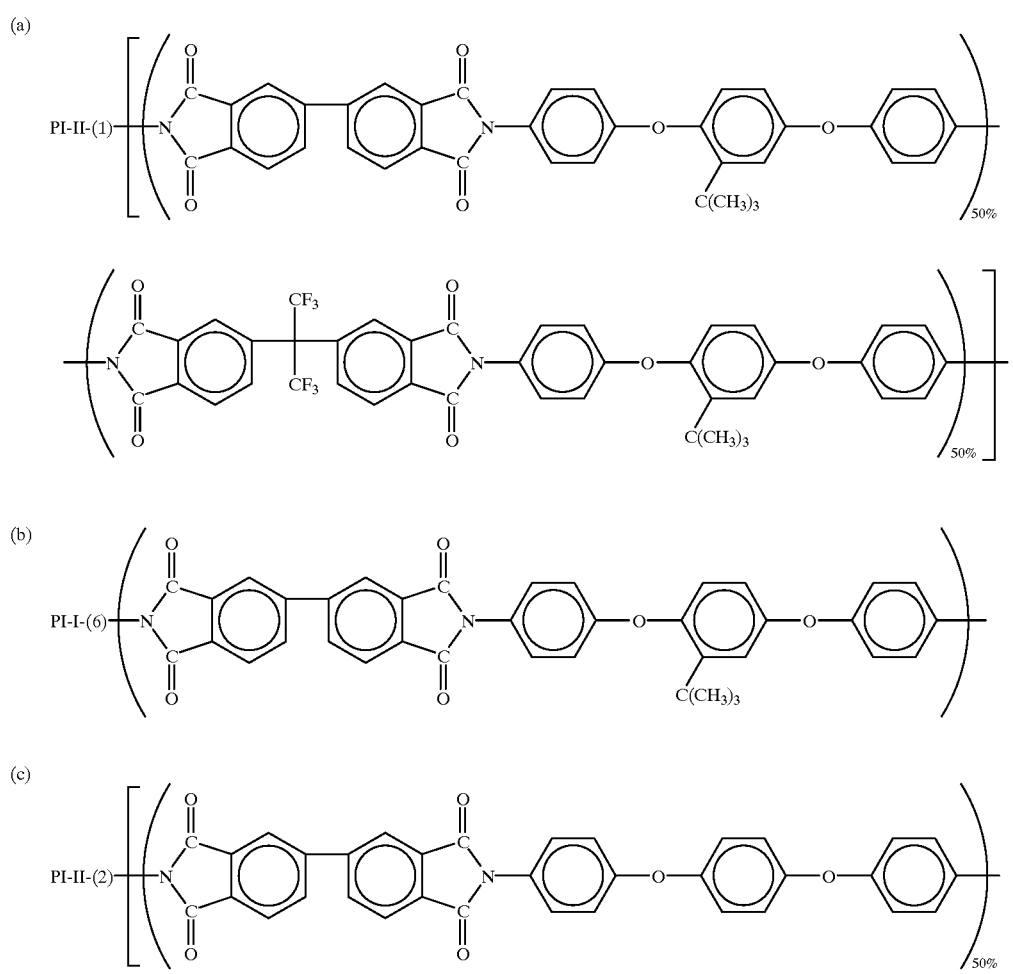

-continued

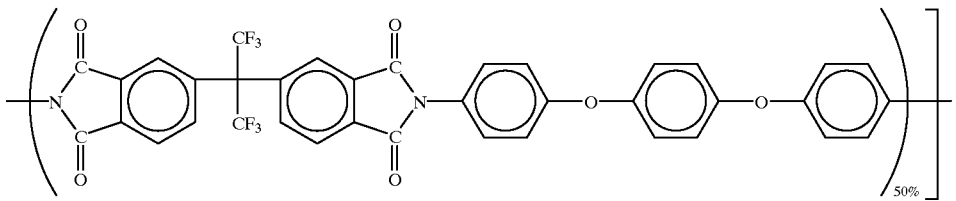

Solubility:

| Code | NMP | DMAc | DMF | DMSO | m-cresol | THF | CH$_2$Cl$_2$ | conc. H$_2$SO$_4$ |
|------|-----|------|-----|------|----------|-----|--------------|-------------------|
| PI-II-(1) | + | + | + | +h | + | + | + | + |
| PI-I-(6)  | – | – | – | –  | +– | – | – | + |
| PI-II-(2) | – | – | – | –  | –  | – | – | + |

EXAMPLE 6

(a) The diamine (II) (0.696 g, 2.0 mmol) was dissolved in 12 mL of dried DMAc in a 50-mL flask. After the diamine was dissolved completely, 0.294 g (1.0 mmol) BDPA and 0.358 g (1.0 mmol) DSDA were added. The mixture was stirred at room temperature for 1 hr and then a mixture of acetic anhydride and pyridine (volume ratio 2:1) 2.5 mL was added to the PAA solution. The mixture was stirred at 80–100° C. for 1 hr. The polymer solution was poured into methanol to yield precipitate which was collected by filtration, washed thoroughly with methanol, and dried at 100° C. ($\eta_{inh}$=1.35 dL/g)

(b) The procedures as described in the Example 3 were repeated in the preparation of PI-I-(6).

(c) 2 mmol of the diamine (II) and 2 mmol of DSDA were dissolved in dried DMAc to prepare a high viscosity solution of poly (ether amic acid) (PAA) according to the same procedures as described in (a). A mixture of acetic anhydride and pyridine (2 mL) was added to the PAA solution. The mixture was stirred at 80° C. for 1 hr. The polyimide solution was poured into methanol. The white resulting polyimide precipitate was collected by filtration, washed thoroughly with methanol, and dried at a suitable temperature. The resulting polyimide PI-I-(4) has an inherent viscosity ($\eta_{inh}$) of 1.18 dL/g in NMP solution (30° C.).

(d) 2 mmol of a diamine [1,4-bis(4-aminophenoxy) benzene] and a mixture of BPDA (1 mmol) and DSDA (1 mmol) were dissolved in dried DMAc to prepare a polyimide according to the same procedures as described in (a). White precipitate (polyimide) was formed in the PAA solution in the chemical cyclodehydration procedure. The resulting polyimide PI-II-(4) has an inherent viscosity ($\eta_{inh}$) of 0.44 dL/g in conc. H$_2$SO$_4$ solution. The four resulting polyimides have the following formulas and solubility:

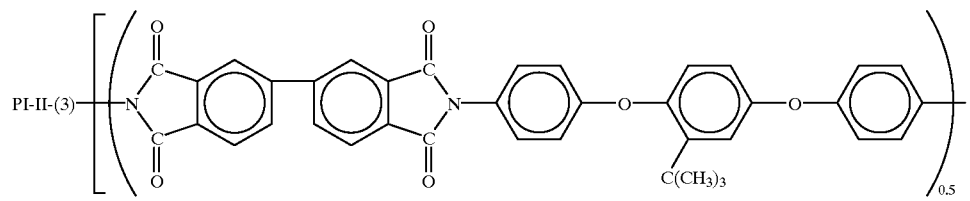

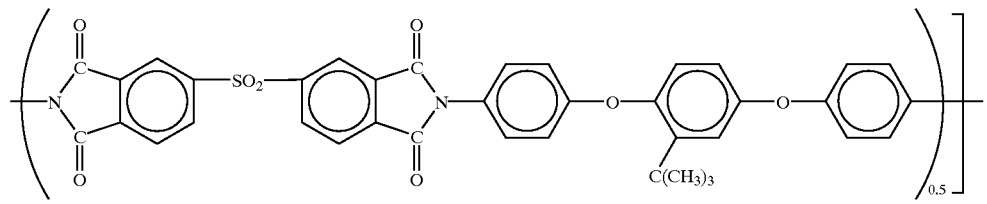

-continued

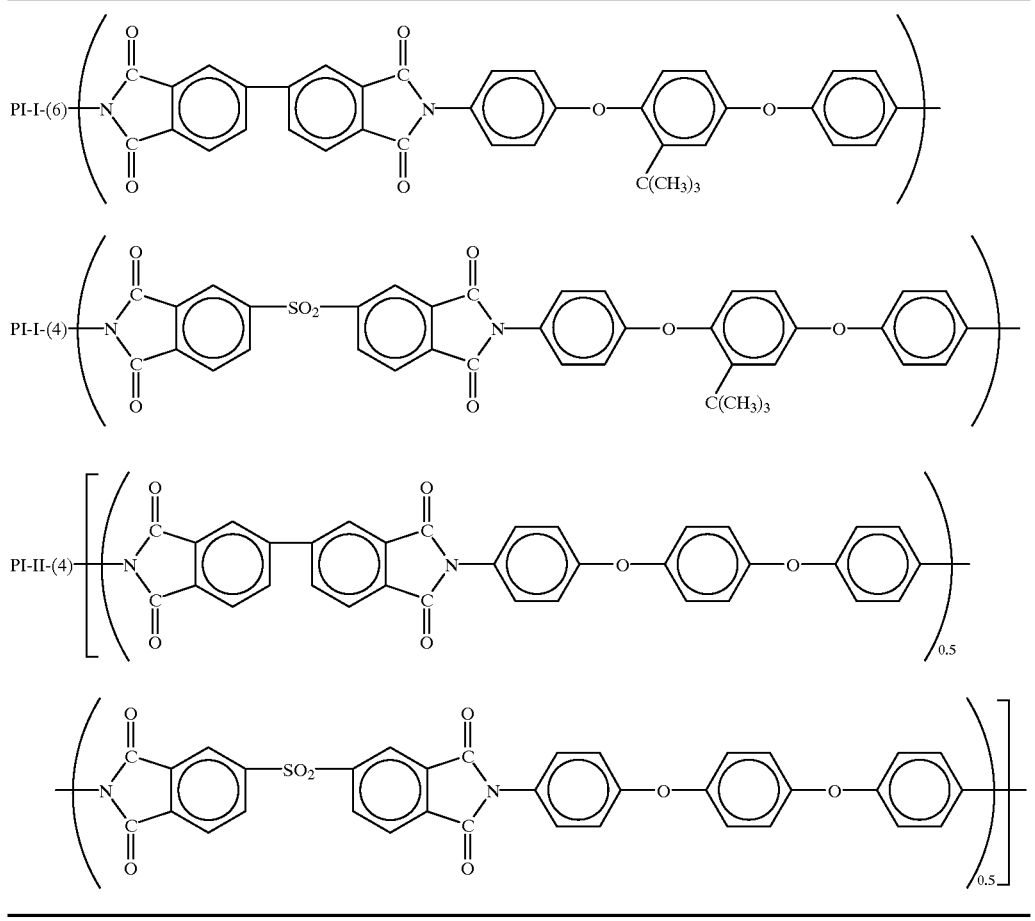

Solubility:

| Code | Solvent | | | | | | | |
|---|---|---|---|---|---|---|---|---|
| | NMP | DMAc | DMF | DMSO | m-cresol | THF | CH$_2$Cl$_2$ | conc. H$_2$SO$_4$ |
| PI-II-(3) | + | + | + | + | + | + | + | + |
| PI-I-(6) | − | − | − | − | +h | − | − | + |
| PI-I-(4) | + | + | + | + | + | + | + | + |
| PI-II-(4) | − | − | − | − | − | − | − | + |

EXAMPLE 7

(a) The diamine (II) (1 mmol) were dissolved in DMAc with a suitable concentration in a 25-mL flask. After the diamine was dissolved completely, PMDA (1 mmol) was added. The mixture was stirred at room temperature for 1 hr to form a PAA solution and then a mixture of acetic anhydride and pyridine (volume ratio 2:1) (1.0 mL) was added to the PAA solution. The resulting mixture was stirred at 100° C. for 40 min. The polymer solution was poured into methanol to yield polyimide precipitate, which was collected by filtration, washed thoroughly with methanol, and dried at 100° C.

(b) Polyimide was prepared from the diamine II (1 mmol) with a dianhydride mixture of PMDA (0.5 mmol) and 6FDA (0.5 mmol) according to the same procedures as described in (a).

(c) Polyimide was prepared from the diamine II (1 mmol) with a dianhydride mixture of PMDA (0.33 mmol) and 6FDA (0.67 mmol) according to the same procedures as described in (a).

(d) Polyimide was prepared from 1,4-bis(4-aminophenoxy)benzene (1 mmol) with a dianhydride mixture of PMDA (0.33 mmol) and 6FDA(0.67 mmol) according to the same procedures as described in (a).

The resulting polyimides (a), (b), (c), and (d) have the following formulas and solubility:

(a)
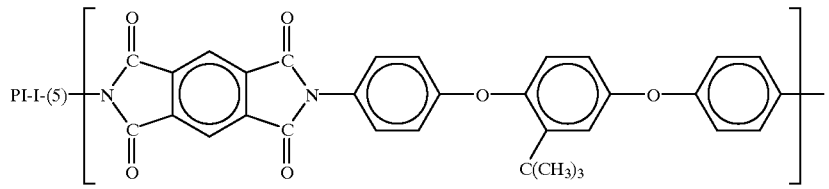
$\eta_{inh}$ = 1.03 dL/g ($H_2SO_4$)
(b)
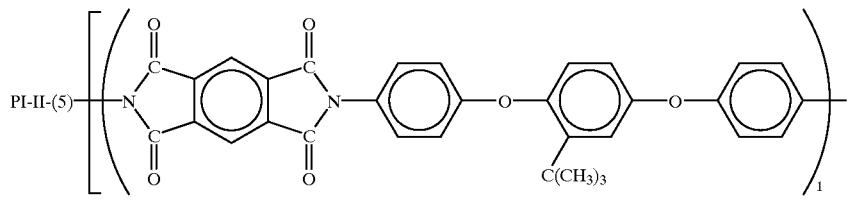
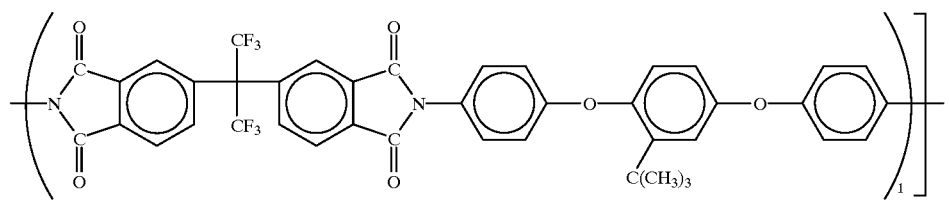
$\eta_{inh}$ = 1.20 dL/g (DMAc)
(c)
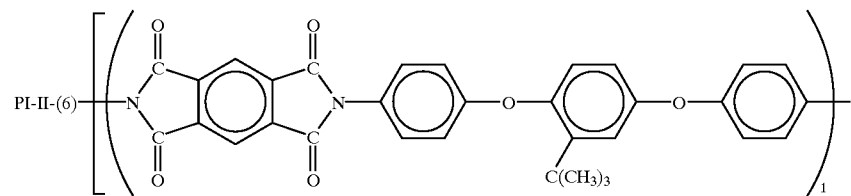
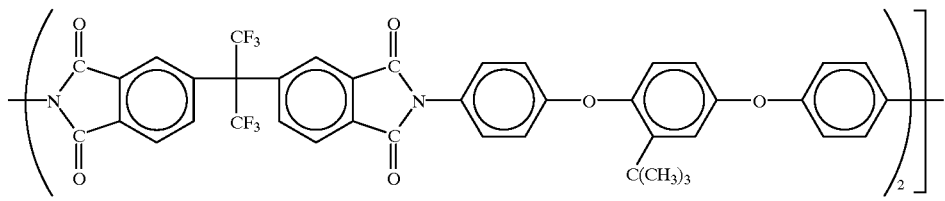
$\eta_{inh}$ = 0.88 dL/g (DMAc)
(d)
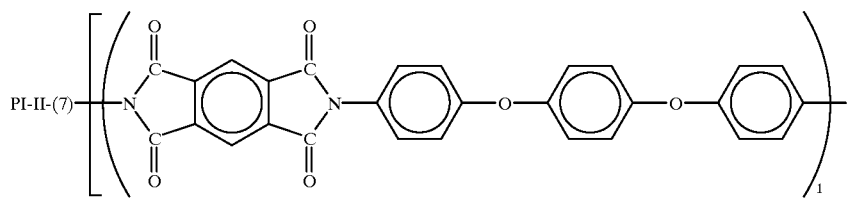

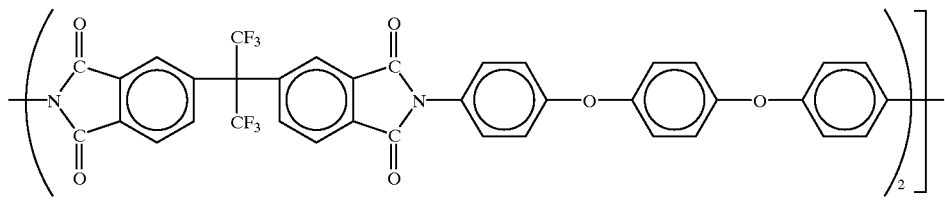

$\eta_{inh}$ = 1.27 dL/g ($H_2SO_4$)

Solubility:

| Code | NMP | DMAc | DMF | DMSO | m-cresol | Py | THF | $CH_2Cl_2$ | conc. $H_2SO_4$ |
|------|-----|------|-----|------|----------|-----|-----|------------|-----------------|
| PI-I-(5) | − | − | − | − | − | − | − | − | + |
| PI-II-(5) | + | +− | + | − | −s | + | − | − | + |
| PI-II-(6) | + | + | + | − | + | + | + | + | + |
| PI-II-(7) | − | − | − | − | − | − | − | − | + |

The results show that co-polyimides composed of organosoluble PI and insoluble PI have a good solubility in organic solvents. Furthermore, solubility of co-PIs will change with various ratios of organosoluble PI and insoluble PI thereof. The co-polyimide, PI-II-(7), prepared from a conventional diamine lack of a t-butyl group is insoluble.

EXAMPLE 8

The diamine (II) and a dianhydride BTDA or a dianhydride mixture of BTDA and SDPA were dissoved in dried DMAc to prepare PI according to the same procedures as described in Example 7. The resulting PI and co-PI have the following formulas and solubility.

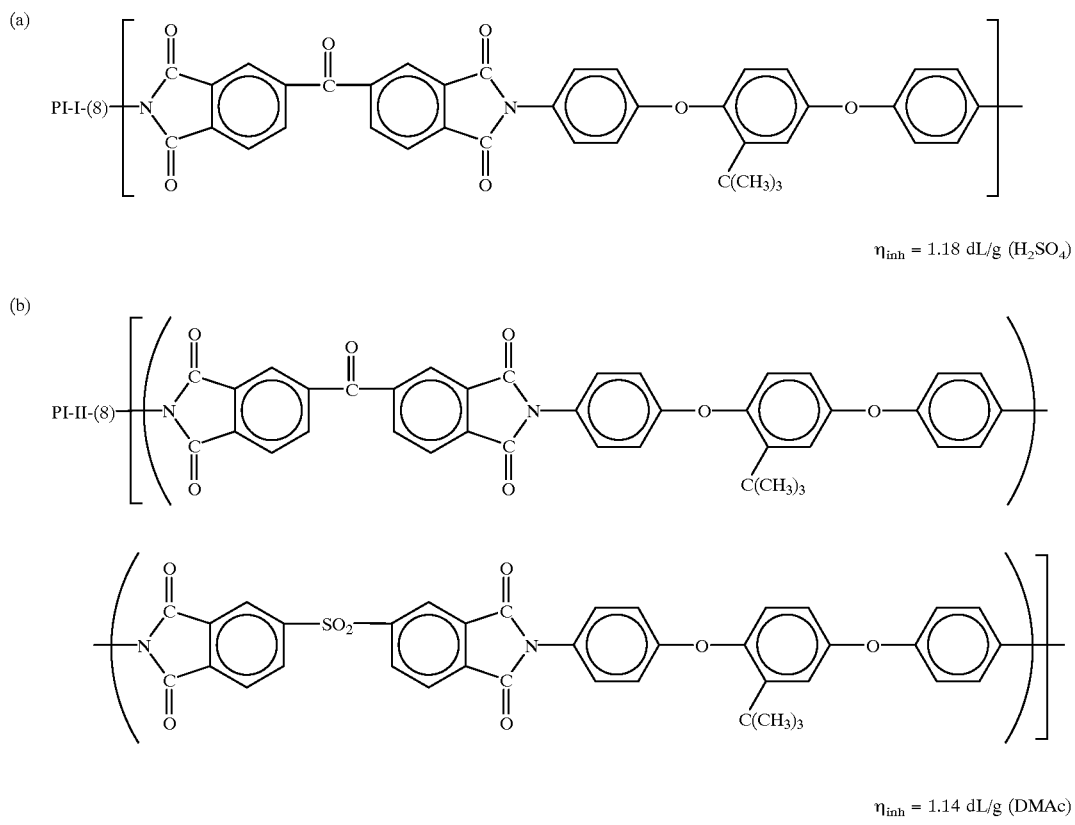

| | Solubility: | | | | | | | | |
|---|---|---|---|---|---|---|---|---|---|
| | Solvent | | | | | | | | |
| Code | NMP | DMAc | DMF | DMSO | m-cresol | Py | THF | $CH_2Cl_2$ | conc. $H_2SO_4$ |
| PI-I-(8) | +− | − | − | − | + | + | − | − | + |
| PI-II-(8) | + | + | + | + | + | + | + | + | + |

The results show that co-PIs, PI-II-(8), has a better organosolubility than the PI, PI-I-(8).

EXAMPLE 9

Polymers were prepared from the diamine II with a dianhydride selected from BPDA, 1,2-bis(3,4-dicarboxyphenoxy)benzene dianhydride and a mixture thereof according to the same procedures as described in Example 7. The resulting PIs and co-Pi have the following formulas and solubility.

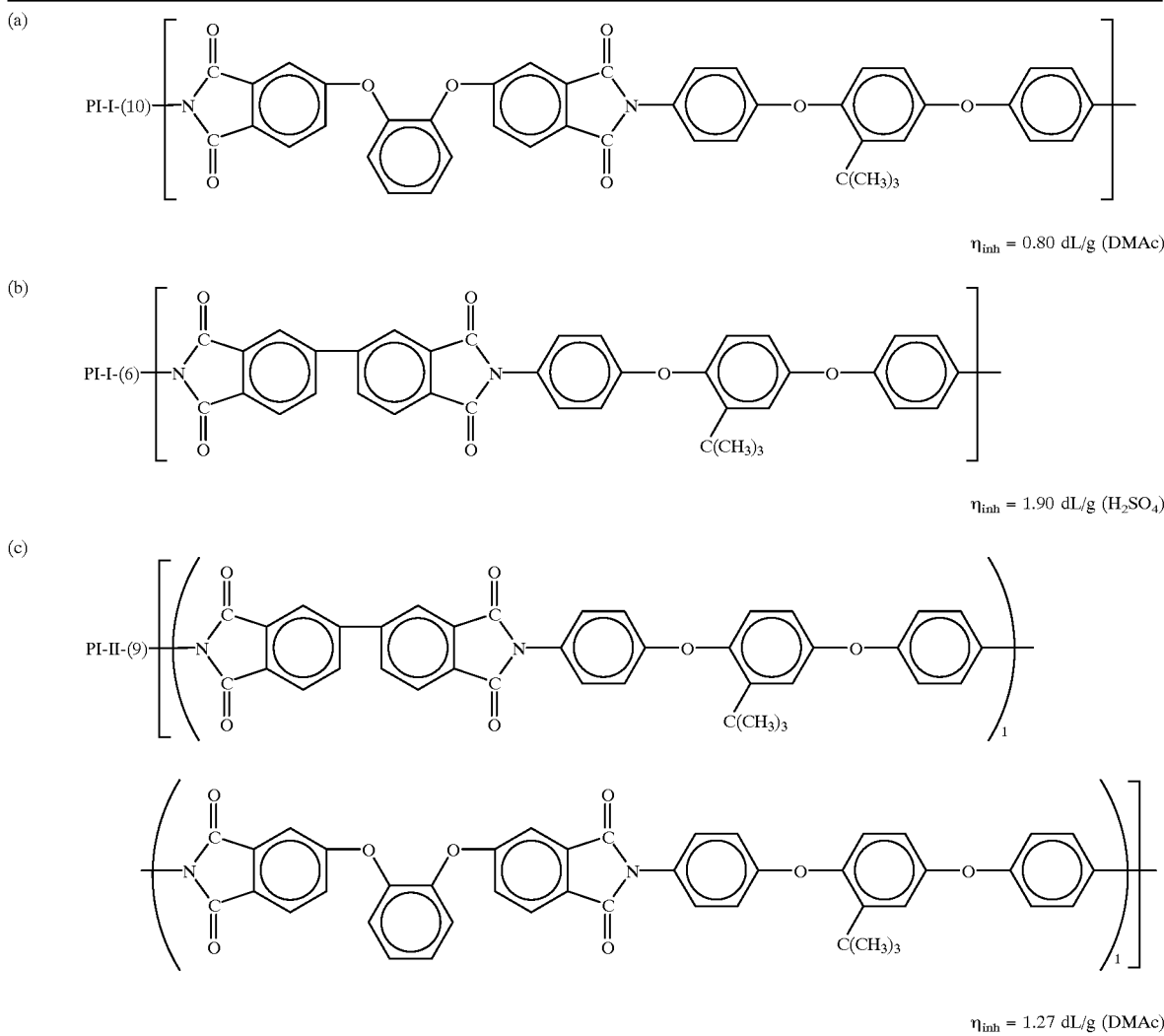

-continued

| | Solubility: Solvent | | | | | | | | |
|---|---|---|---|---|---|---|---|---|---|
| Code | NMP | DMAc | DMF | DMSO | m-cresol | Py | THF | $CH_2Cl_2$ | conc. $H_2SO_4$ |
| PI-I-(10) | + | + | +− | +− | + | + | + | + | + |
| PI-I-(6) | − | − | − | − | +h | − | − | − | + |
| PI-II-(9) | + | + | + | − | + | − | + | + | + |

The results of Example 9 show that a co-PI (PI-II-(9)) containing units of an organosoluble PI (PI-I-(10)) and an insoluble PI (PI-I-(6)) can still have organosolubility.

EXAMPLE 10 co-PI was prepared from two different diamines and a dianhydride (a) 4,4'-ODA (0.2 g) was dissolved in dried DMAc (5 mL) and then SDPA (0.358g) was added to prepare PI by chemical cyclodehydration.

(b) A mixture of 4,4'-ODA (0.2 g) and the diamine (II) (0.174 g) was dissolved in dried DMAc(5mL) and then SDPA (0.358 g) was added to yield PAA solution. The resulting mixture was stirred with a mixture of acetic anhydride and pyridine (volume ratio 2:1) at 80° C. for 1 hr, and was poured into methanol to form a co-PI. The formulas and inherent viscosity of the resulting PI and co-PI are shown as follows:

(a) PI-I'-(1)  $\eta_{inh}$ (dL/g) = 1.30 (conc ($H_2SO_4$))

(b) PI-II-(10)  $\eta_{inh}$ (dL/g) = 1.00 (DMAc)

| | Solubility: Solvent | | | | | | | | |
|---|---|---|---|---|---|---|---|---|---|
| Code | NMP | DMAc | DMF | DMSO | m-cresol | Py | THF | $CH_2Cl_2$ | conc. $H_2SO_4$ |
| PI-I-(1') | − | − | − | − | − | − | − | − | + |
| PI-II-(10) | + | + | + | − | + | − | + | + | + |

EXAMPLE 11 co-PI was prepared with two different diamines and two different dianhydrides

The diamine II (0.348 g) and 2,2-bis[4-(4-aminephenoxyl)phenyl]propane (0.41 g) were dissolved in 12 mL of dried DMAc in a 25-mL flask. After the diamine was dissolved completely, BPDA (0.294 g) and 6FDA (0.444 g) were added. The mixture was stirred at room temperature for 1 hr. A mixture of acetic anhydride and pyridine (volume ratio 2:1) (1.0 mL) was added to the PAA solution. The mixture was stirred with a mixture of acetic anhydride and pyridine (volume ratio 2:1) at 100° C. for 40 min. The polymer solution was poured into methanol to form white precipitate. The white precipitate was collected by filtration, washed thoroughly with methanol, and dried at 100° C. The resulting co-polyimide PI-II-(11) has an inherent viscosity ($\eta_{inh}$) of 1.15 dL/g in DMAc solution (30° C.). The resulting polyimide has the following formula and solubility:

EXAMPLE 12

Directly condensation of two different diamines and two different dianhydrides in m-cresol solution A diamine mixture of the diamine II (0.348 g, 1 mmol) and 4,4'-[1,3 -phenylenebis(isopropylidene-1,3-phenyleneoxy)]dianiline (0.528 g;1 mmol) was dissolved in distilled m-cresol (10 mL) in 50 mL flask. After the diamine mixture was dissolved completely, a dianhydride mixture of ODPA and DSDA was added. The resulting mixture was stirred at 40–50° C. for 1 hr, was stirred in $N_2$ in sequence at 150° C., 180, and 200° C. for 30 minutes each, and was poured into methanol to yield PI-II-(12), which has a $\eta_{inh}$ of 1.21 dL/g (DMAc). Other properties of the polymer are described as follows:

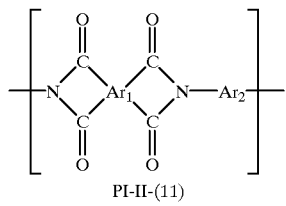

PI-II-(11)

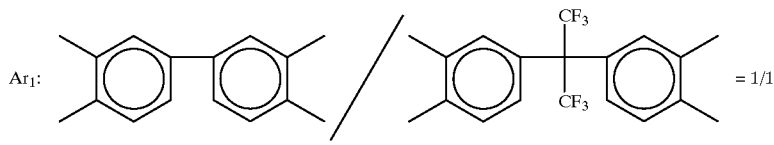

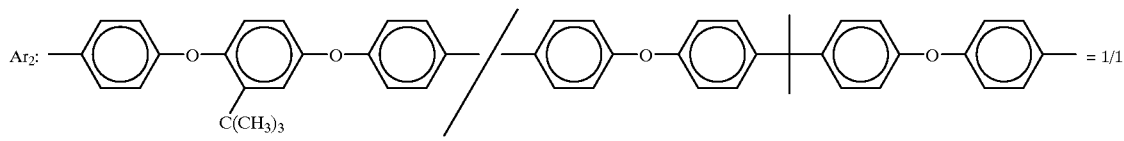

Solubility:

| Code | NMP | DMAc | DMF | DMSO | m-cresol | Py | THF | $CH_2Cl_2$ | conc. $H_2SO_4$ |
|---|---|---|---|---|---|---|---|---|---|
| PI-II-(11) | + | + | + | +h | + | − | + | + | + |

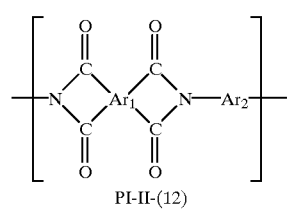

PI-II-(12)

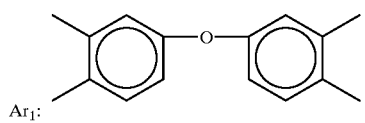

| Solubility: | | | | | | | | | |
|---|---|---|---|---|---|---|---|---|---|
| | | | | Solvent | | | | | |
| Code | NMP | DMAc | DMF | DMSO | m-cresol | Py | THF | CH$_2$Cl$_2$ | conc. H$_2$SO$_4$ |
| PI-II-(12) | + | + | + | +h | + | +h | + | + | + |

EXAMPLE 13

PI was prepared with two different diamines and two different dianhydrides, wherein one of the diamines is a conventional diamine

PI-II-(13) was prepared from a diamine mixture of 4-4'-ODA and the diamine (II) with a dianhydride mixture of BPDA and 1,4-bis(3,4-dicarboxyphenoxy)-2-terbutylbenzene dianhydride according to the same procedures as described in Example 11. A quantitative yield of PI-II-(13) was produced and its formula and solubility of PI-II-(13) are showed as follows:

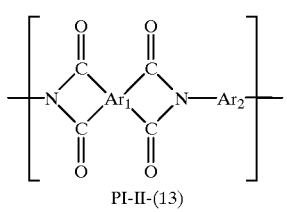

PI-II-(13)

-continued

Ar$_1$: [structures] = 1/1

Ar$_2$: [structures] = 1/1

$\eta_{inh}$ = 1.73 dL/g (DMAc)

Solubility:

| Code | NMP | DMAc | DMF | DMSO | m-cresol | Py | THF | CH$_2$Cl$_2$ | conc. H$_2$SO$_4$ |
|---|---|---|---|---|---|---|---|---|---|
| PI-II-(13) | + | + | +− | − | + | − | − | + | + |

Comparing the results of Examples 11, 12 and 13, it shows that solubility of co-polyimide can be controlled by varying the composition of diamines and dianhydrides.

EXAMPLE 14

Mechanical and thermal properties of organo-soluble PIs (a) Diamine II (0.348 g;1 mmol) was dissolved in 6 mL of dried DMAc in a 25-mL flask. After the diamine was dissolved completely, BTDA (0.161 g; 0.5 mmol) and 6FDA (0.222 g; 0.5 mmol) were added. The mixture was stirred at room temperature for 1 hr and a high viscosity poly(amic acid) (PAA) was obtained. The PI-II-(14) was prepared according to the thermal cyclodehydration procedures as described in Example 2. A 0.05 mm PI-II-(14) film was obtained.

(b) Diamine II (0.348 g; 1 mmol) was dissolved in 5 mL of dried DMAc in a 25-mL flask. After the diamine was dissolved completely, PMDA (0.109 g) and DSDA (0.179 g) were added. A PI-II-(15) film was prepared according to the thermal cyclodehydration procedures as described in Example 2.

(i) Chemical structure and viscosity of polymers

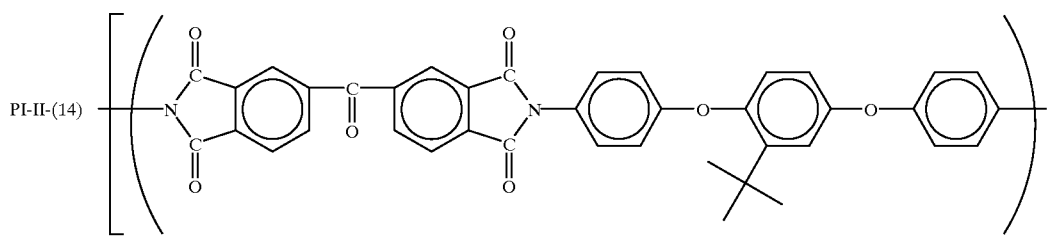

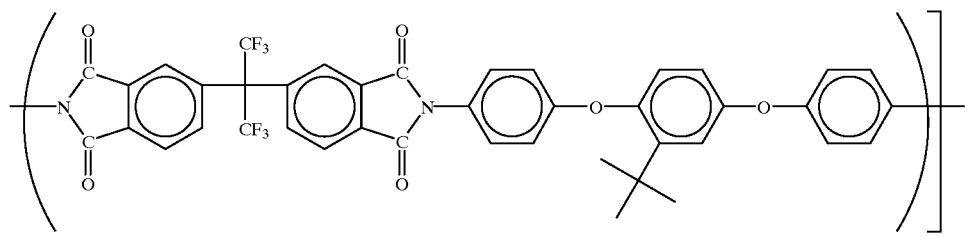

$\eta_{inh}$ = 1.40 dL/g

PI-II-(15) 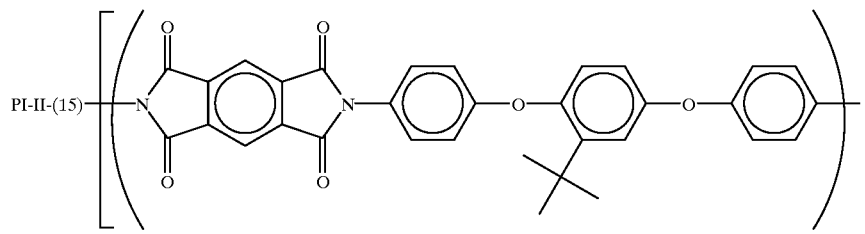

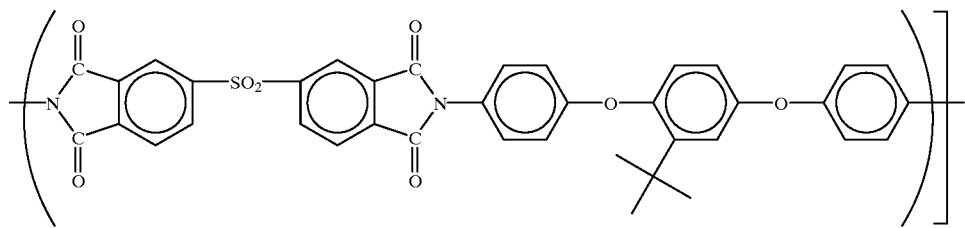

$\eta_{inh}$ = 0.82 dL/g (ii) Solubility of polymers

| Code | NMP | DMAc | DMF | DMSO | m-cresol | Py | THF | CH$_2$Cl$_2$ | conc. H$_2$SO$_4$ |
|---|---|---|---|---|---|---|---|---|---|
| PI-II-(14) | + | + | + | + | + | + | + | + | + |
| PI-II-(15) | + | + | + | + | + | + | +− | +− | + |

(iii) Mechanical properties of polymers

| | Strength at yield | Strength at break | Elongation to break | Initial modulus |
|---|---|---|---|---|
| PI-II-(14) | 129 MPa | 113 MPa | 12% | 2.9 GPa |
| PI-II-(15) | 110 MPa | 102 MPa | 22% | 2.2 GPa |

(iv) Thermal properties of polymers

| | $T_g$ | $Td_{10}$ | Residual wt % at 800° C. in N$_2$ |
|---|---|---|---|
| PI-II-(14) | 268° C. | 536° C. | 53% |
| PI-II-(15) | 283° C. | 536° C. | 51% |

What is claimed is:

1. An organosoluble polyimide comprising units represented by the following formula:

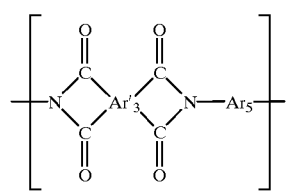

wherein

Ar$_5$ is

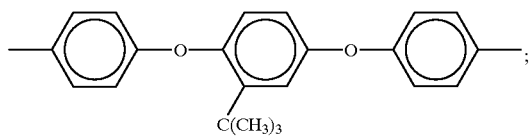;

Ar'$_3$ is selected from the group consisting essentially of

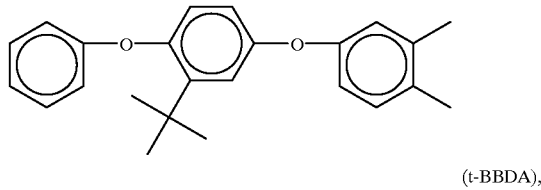

(t-BBDA),

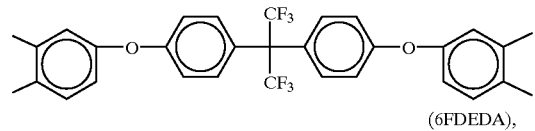

(6FDEDA),

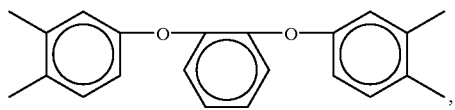,

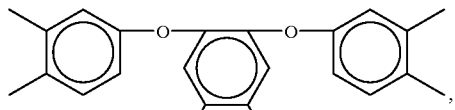, and

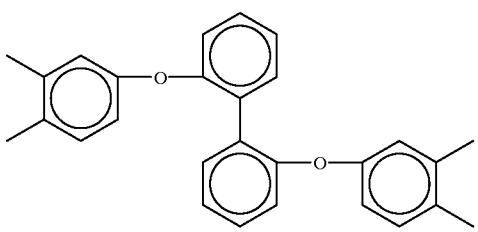

2. An organosoluble co-polyimide comprising units represented by the following formula:

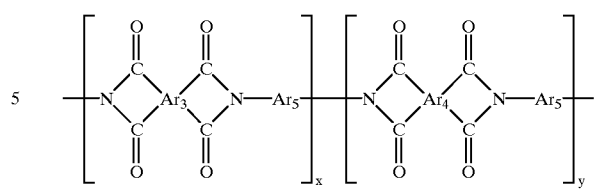

wherein

Ar$_5$ is

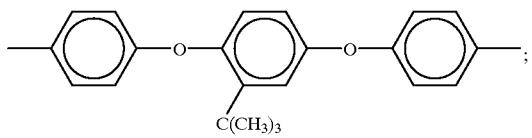;

Ar$_3$ is selected from the group consisting essentially of

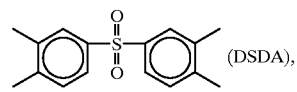 (DSDA),

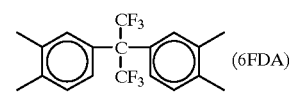 (6FDA),

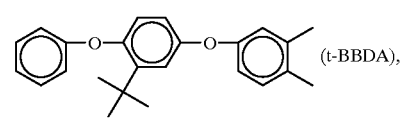 (t-BBDA),

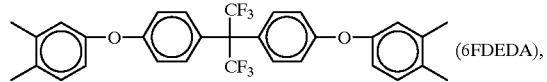 (6FDEDA),

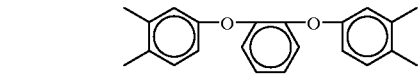,

, and

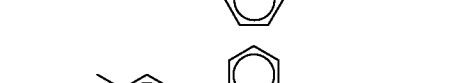

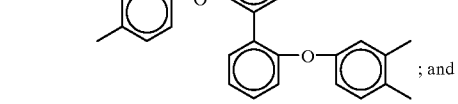; and

Ar$_4$ is selected from the group consisting essentially of

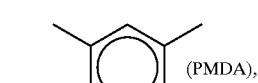 (PMDA),

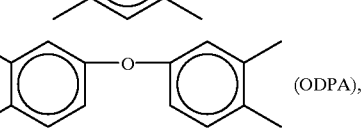 (ODPA),

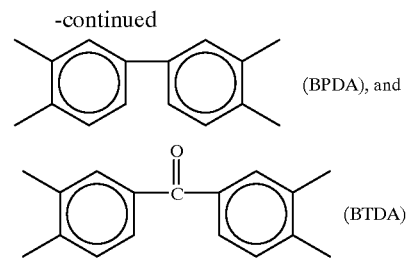(BPDA), and

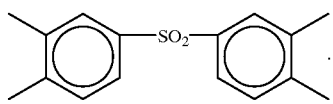(BTDA)

wherein the units containing Ar₃ and Ar₄ are randomly arranged in said formula.

3. The co-polyimide according to claim 2, wherein x and y are so arranged that (the units containing Ar₃):(the units containing Ar₄)=99:1~5:95 (by weight).

4. The co-polyimide according to claim 2, wherein Ar₃ is

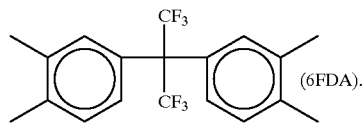

5. The co-polyimide according to claim 2, wherein A₃ is

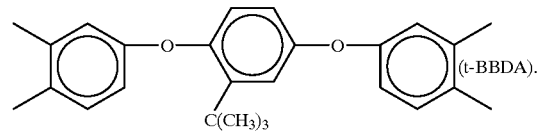(6FDA).

6. The co-polyimide according to claim 2, wherein Ar₃ is

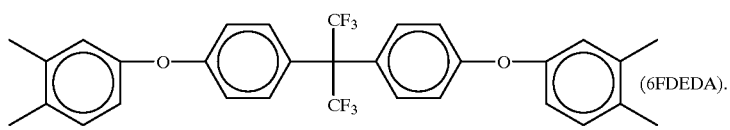(t-BBDA).

7. The co-polyimide according to claim 2, wherein Ar₃ is

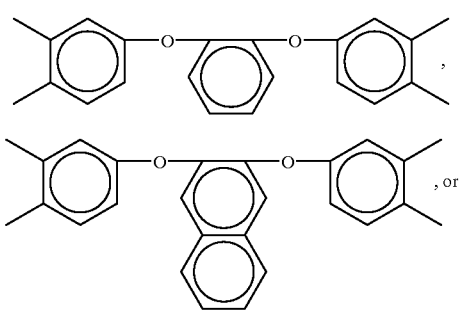(6FDEDA).

8. The co-polyimide according to claim 2, wherein Ar₃ is

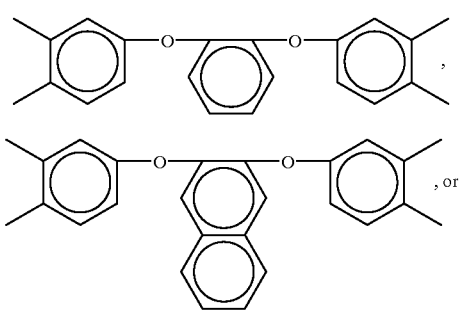, or

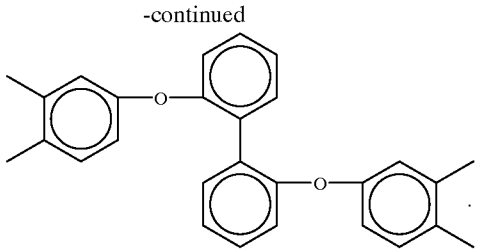

9. An organosoluble co-polyimide comprising units represented by the following formula:

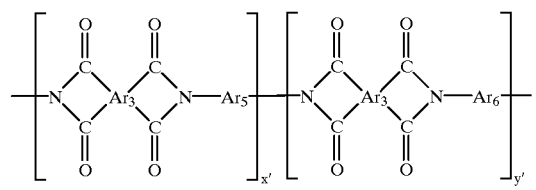

wherein

Ar₅ is

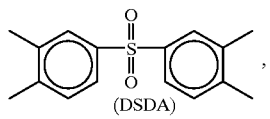;

Ar₃ is selected from the group consisting essentially of

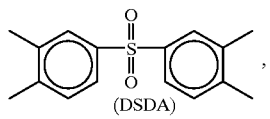(DSDA),

-continued

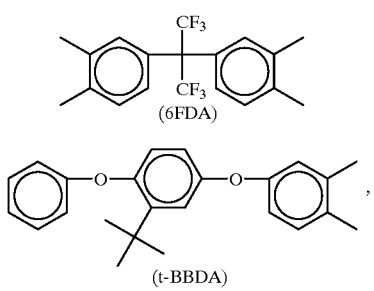(6FDA)

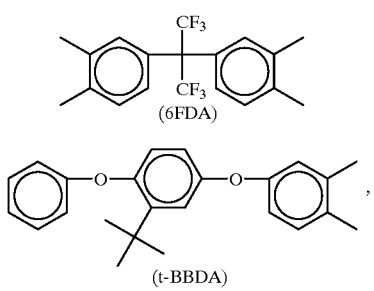(t-BBDA)

-continued

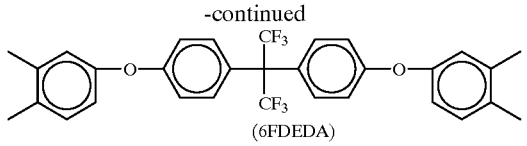
(6FDEDA)

and

and
Ar₆ is

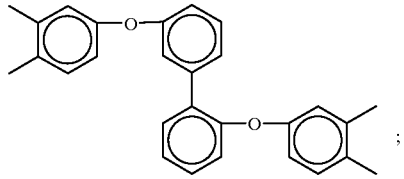

wherein
Z=O, S, CH₂, CO, SO₂, C(Me)₂, C(CF₃)₂, CR¹R², X—C₆H₄—X, X—C₁₀H₈—X, X—C₆R¹, R², R³, R⁴—X, X—C₆H₄—Y—C₆H₄—X, or polysiloxane main chain;
wherein
X=O, S, or CR¹R²; and
Y=O, S, CH₂, CO, SO₂, C(Me)₂, C(CF₃)₂, CR¹R², aliphatic chain, or C₆H₁₀;
wherein R¹, R², R³, and R⁴ independent=H, halogen, Me, CF₃, or C(Me)₃, wherein Me=methyl group,
wherein the units containing Ar₅ and Ar₆ are randomly arranged in said formula.

10. The co-polyimide according to claim 9, wherein x' and y' are so arranged that (the units containing Ar₅):(the units containing Ar₆)=99:1~5:95 (by weight).

11. The co-polyimide according to claim 9, wherein Ar₃ is

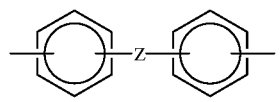

12. The co-polyimide according to claim 9, wherein Ar₃ is

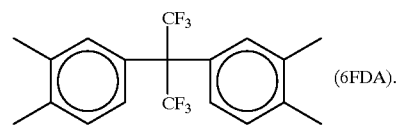
(6FDA).

13. The co-polyimide according to claim 9, wherein Ar₃ is

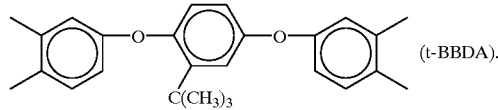
(t-BBDA).

14. The co-polyimide according to claim 9, wherein Ar₃ is

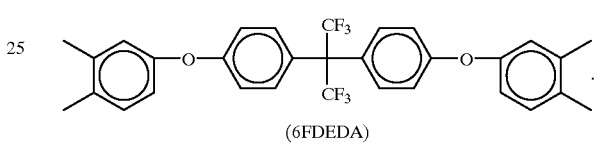
(6FDEDA)

15. The co-polyimide according to claim 9, wherein Ar₃ is

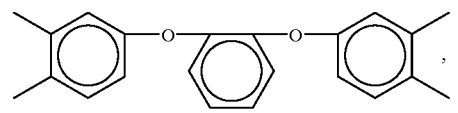

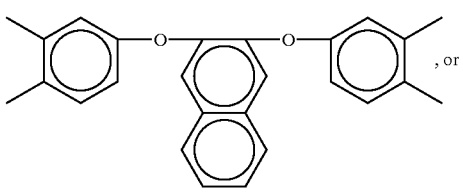, or

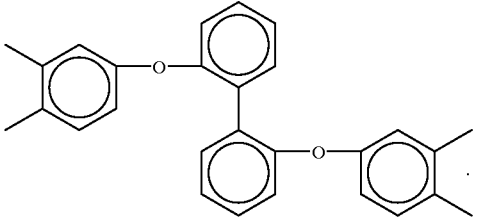

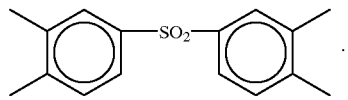

16. An organosoluble co-polyimide comprising units represented by the following formula:

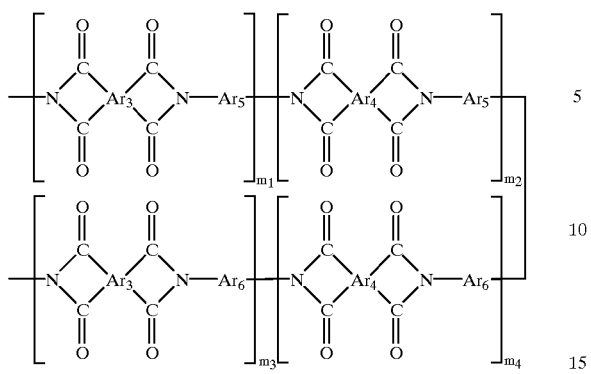

wherein the four different units having molar ratios of $m_1$, $m_2$, $m_3$ and $m_4$ are randomly arranged in said formula, wherein $Ar_5$ is

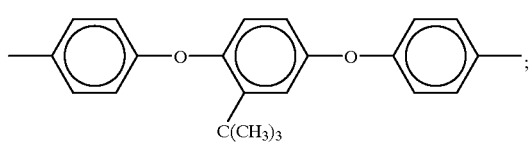

$Ar_3$ is selected from the group consisting essentially of

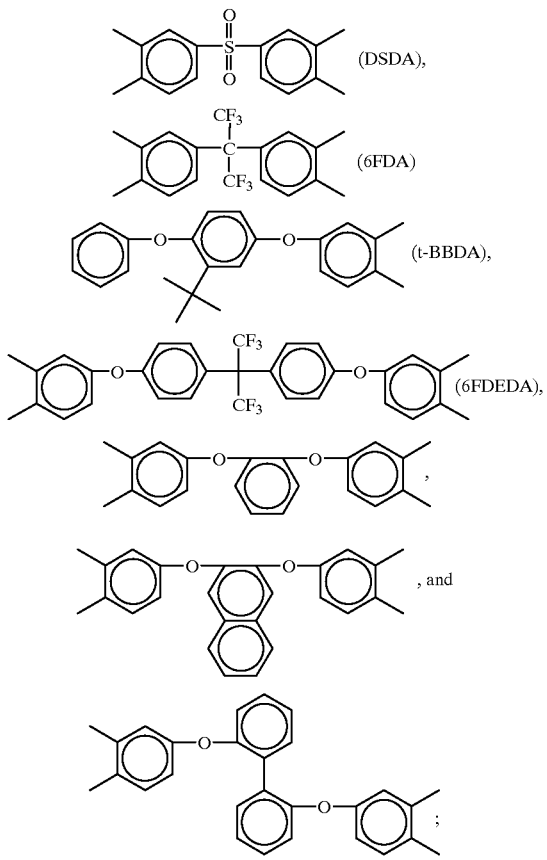

$Ar_4$ is selected from the group consisting essentially of

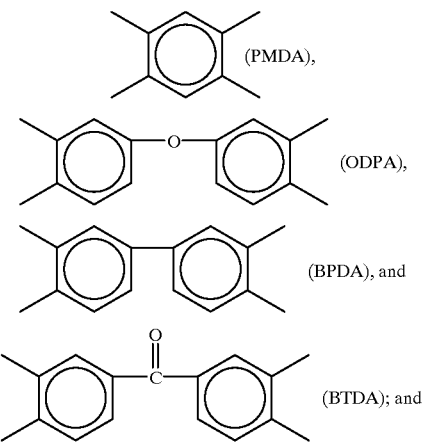

$Ar_6$ is

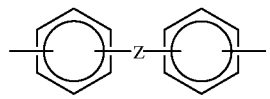

wherein $Z = O$, S, $CH_2$, CO, $SO_2$, $C(Me)_2$, $C(CF_3)_2$, $CR^1R^2$, $X-C_6H_4-X$, $X-C_{10}H_8-X$, $X-C_6R^1,R^2,R^3,R^4-X$, $X-C_6H_4-Y-C_6H_4-X$, or polysiloxane main chain;

wherein $X = O$, S, or $CR^1R^2$; and $Y = O$, S, $CH_2$, CO, $SO_2$, $C(Me)_2$, $C(CF_3)_2$, $CR^1R^2$, aliphatic chain, or $C_6H_{10}$;

wherein $R^1$, $R^2$, $R^3$, and $R^4$ independent=H, halogen, Me, $CF_3$, or $C(Me)_3$, wherein Me=methyl group.

17. The co-polyimide according to claim 16, wherein $m_1$, $m_2$, $m_3$ and $m_4$ are so arranged that the units containing $Ar_5$ is greater than 5 wt % and the units containing $Ar_3$ is greater than 5 wt % based on the weight of the co-polyimide.

18. The co-polyimide according to claim 16, wherein $Ar_3$ is

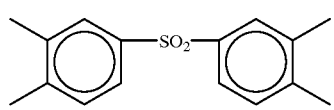

19. The co-polyimide according to claim 16, wherein $Ar_3$ is

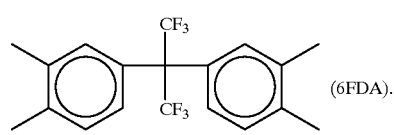

20. The co-polyimide according to claim 16, wherein $Ar_3$ is

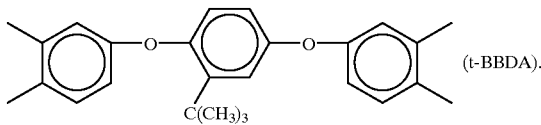

(t-BBDA).

21. The co-polyimide according to claim 16, wherein Ar₃ is

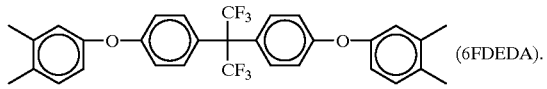

(6FDEDA).

22. The co-polyimide according to claim 16, wherein Ar₃ is

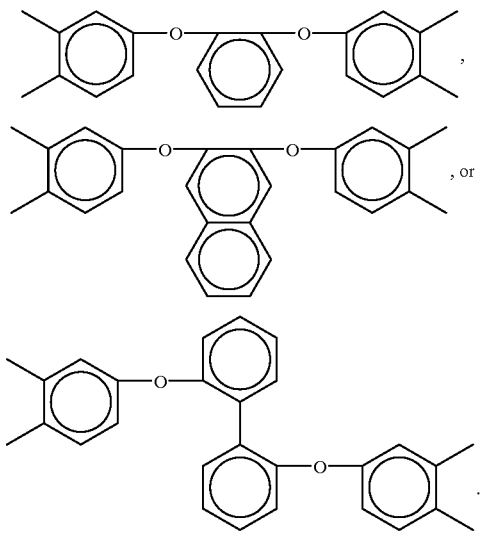

23. An organic solution of a polyimide comprising an organic solvent and the polyimide of claim 1 which dissolve in said organic solution, wherein the organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, chloromethane, and chloroethane.

24. An organic solution of a co-polyimide comprising an organic solvent and the co-polyimide of claim 2 which dissolve in said organic solution, wherein the organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, chloromethane, and chloroethane.

25. An organic solution of a co-polyimide comprising an organic solvent and the co-polyimide of claim 9 which dissolve in said organic solution, wherein the organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, chloromethane, and chloroethane.

26. An organic solution of a co-polyimide comprising an organic solvent and the co-polyimide of claim 16 which dissolve in said organic solution, wherein the organic solvent is selected from the group consisting essentially of N-methyl-2-pyrrolidone (NMP), N,N-dimethylacetamide (DMAc), N,N-dimethylformamide (DMF), dimethyl sulfoxide (DMSO), m-cresol, pyridine, chloromethane, and chloroethane.

27. A method for forming a polyimide film comprising the following steps: mixing the polyimide of claim 1 and an organic solvent to form an organic solution of said polyimide; casting or coating said organic solution on a substrate to form a layer; and removing said solvent from said layer to form a polyimide film.

28. A method for forming a co-polyimide film comprising the following steps: mixing the co-polyimide of claim 2 and an organic solvent to form an organic solution of said co-polyimide; casting or coating said organic solution on a substrate to form a layer; and removing said solvent from said layer to form a co-polyimide film.

29. A method for forming a co-polyimide film comprising the following steps: mixing the co-polyimide of claim 9 and an organic solvent to form an organic solution of said co-polyimide; casting or coating said organic solution on a substrate to form a layer; and removing said solvent from said layer to form a co-polyimide film.

30. A method for forming a co-polyimide film comprising the following steps: mixing the co-polyimide of claim 16 and an organic solvent to form an organic solution of said co-polyimide; casting or coating said organic solution on a substrate to form a layer; and removing said solvent from said layer to form a co-polyimide film.

31. A method for forming a polyimide film comprising the following steps: casting or coating said organic solution of claim 23 on a substrate to form a layer; and removing said solvent from said layer to form a polyimide film.

32. A method for forming a co-polyimide film comprising the following steps: casting or coating said organic solution of claim 24 on a substrate to form a layer; and removing said solvent from said layer to form a co-polyimide film.

33. A method for forming a co-polyimide film comprising the following steps: casting or coating said organic solution of claim 25 on a substrate to form a layer; and removing said solvent from said layer to form a co-polyimide film.

34. A method for forming a co-polyimide film comprising the following steps: casting or coating said organic solution of claim 26 on a substrate to form a layer; and removing said solvent from said layer to form a co-polyimide film.

* * * * *